(12) United States Patent
Robison

(10) Patent No.: US 9,586,837 B2
(45) Date of Patent: Mar. 7, 2017

(54) DISINFECTION OF WATER MAINS USING ULTRAVIOLET LIGHT

(71) Applicant: AMERICAN WATER WORKS COMPANY, INC., Voorhees, NJ (US)

(72) Inventor: Martin L. Robison, O'Fallon, MO (US)

(73) Assignee: AMERICAN WATER WORKS COMPANY, INC., Voorhees, NJ (US)

( * ) Notice: Subject to any disclaimer, the term of this patent is extended or adjusted under 35 U.S.C. 154(b) by 112 days.

(21) Appl. No.: 13/942,409

(22) Filed: Jul. 15, 2013

(65) Prior Publication Data
US 2015/0017061 A1    Jan. 15, 2015

(51) Int. Cl.
*C02F 1/32*       (2006.01)

(52) U.S. Cl.
CPC ........ *C02F 1/325* (2013.01); *C02F 2201/008* (2013.01); *C02F 2201/009* (2013.01); *C02F 2201/326* (2013.01); *C02F 2201/3225* (2013.01); *C02F 2201/3227* (2013.01); *C02F 2209/008* (2013.01); *C02F 2303/04* (2013.01); *C02F 2307/14* (2013.01)

(58) Field of Classification Search
CPC ...... A61L 2/08; A61L 2/10; C02F 1/32; C02F 1/325
See application file for complete search history.

(56) References Cited

U.S. PATENT DOCUMENTS

| | | | | |
|---|---|---|---|---|
| 2,017,042 A | * | 10/1935 | Dougherty | 118/105 |
| 2,461,517 A | * | 2/1949 | Carnevale | 118/306 |
| 2,887,118 A | * | 5/1959 | Loeffler et al. | 134/112 |
| 3,074,098 A | * | 1/1963 | Downing | 15/314 |
| 3,833,175 A | * | 9/1974 | Pulk et al. | 239/160 |
| 4,073,302 A | * | 2/1978 | Jones | 134/167 C |
| 4,418,437 A | * | 12/1983 | French | 15/104.09 |
| 4,763,376 A | * | 8/1988 | Spurlock et al. | 15/104.31 |
| 5,020,188 A | * | 6/1991 | Walton | 15/406 |
| 5,113,885 A | * | 5/1992 | Ramsey | 134/167 C |
| 5,311,641 A | * | 5/1994 | Matsuura et al. | 15/406 |
| 5,317,782 A | * | 6/1994 | Matsuura et al. | 15/324 |
| 5,322,080 A | * | 6/1994 | Rankin | 134/167 C |
| 5,322,569 A | * | 6/1994 | Titus | A61L 2/0011 134/1 |
| 5,377,381 A | * | 1/1995 | Wilson | 15/304 |
| 5,528,789 A | * | 6/1996 | Rostamo | 15/104.12 |
| 5,561,883 A | * | 10/1996 | Landry et al. | 15/302 |
| 5,915,395 A | * | 6/1999 | Smith | 134/22.12 |

(Continued)

FOREIGN PATENT DOCUMENTS

| | | | | |
|---|---|---|---|---|
| CA | WO 02079095 A1 | * | 10/2002 | C02F 1/325 |
| DE | 102007038868 B4 | * | 4/2011 | F16L 55/162 |

*Primary Examiner* — Regina M Yoo
(74) *Attorney, Agent, or Firm* — Shook, Hardy & Bacon L.L.P.

(57) ABSTRACT

Methods are provided for disinfecting water mains using ultraviolet (UV) light. One or more UV light sources are provided and secured to a movable device that moves axially in a pipe. The frequency and intensity of the UV light is determined based on characteristics of the pipe, such as its material and size. The rate at which the movable device moves through the pipe is also determined so that the interior surface of the pipe is properly disinfected. The movable device is remotely caused to move through the pipe.

17 Claims, 9 Drawing Sheets

(56) References Cited

U.S. PATENT DOCUMENTS

| | | | | |
|---|---|---|---|---|
| 6,206,016 B1* | 3/2001 | MacNeil et al. | ............ | 134/168 C |
| 6,371,631 B1* | 4/2002 | Reutemann | .................. | 362/390 |
| 6,653,647 B1* | 11/2003 | Vilarasau Alegre | ...... | 250/504 R |
| 7,159,600 B2* | 1/2007 | MacNeil et al. | .............. | 134/199 |
| 7,812,328 B2* | 10/2010 | Betz | ........................... | 250/493.1 |
| 8,308,137 B2* | 11/2012 | Alles | ................... | 254/134.3 FT |
| 8,549,697 B1* | 10/2013 | Moyher et al. | ................ | 15/320 |
| 2007/0210236 A1* | 9/2007 | Yungner et al. | .............. | 248/678 |
| 2011/0004342 A1* | 1/2011 | Knopow | .................. | A47L 5/28 700/253 |
| 2012/0313014 A1* | 12/2012 | Stibich et al. | ............. | 250/492.1 |
| 2012/0313532 A1* | 12/2012 | Stibich et al. | ................ | 315/150 |
| 2012/0315186 A1* | 12/2012 | Davis | ............................ | 422/24 |
| 2013/0175460 A1* | 7/2013 | Farren | ...................... | 250/504 R |

\* cited by examiner

DISINFECTION OF WATER MAINS USING ULTRAVIOLET LIGHT

BACKGROUND

When a new water main is installed, it is disinfected prior to being used to transport water. The typical disinfection method is super-chlorination of approximately 50 parts-per-million (ppm) of free chlorine. The chlorinated water may sit in the water main for a prolonged period of time, sometimes up to 24 hours. The main is then flushed with system water. This process requires a trailer stocked with pressure pumps, barrels to hold bleach, metering pumps, pressure gauges, generators to power the pumps, and a variety of piping. All of this equipment is prone to maintenance, which can be costly and time consuming.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter. In brief and at a high level, this disclosure describes, among other things, methods and apparatuses for using ultraviolet (UV) light to disinfect pipe, such as a water main prior to its use to transport water. The UV light may be coupled to a remotely controlled device that moves axially in the pipe to provide the proper dosage of the UV light to the interior surface of the pipe. The intensity and frequency needed from the UV light is determined based on one or more characteristics of the pipe. The frequency range of the UV light, based on its purpose of disinfection, may be between 10 nm and 400 nm, and more specifically, between 100 nm and 280 nm, which is a short wave that may be used as a germicide. In some embodiment, one light source (e.g., one UV light) is utilized for a pipe, but in other embodiments, multiple UV lights are used to move the light source closer to the interior walls of the pipe. Further, the remotely controlled device may move axially in the pipe at a rate determined by the dosage needed to disinfect the interior surfaces of the pipe. The remotely controlled device may be connected to a winch that controls the movement of the device by way of a tether, such as a cable.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
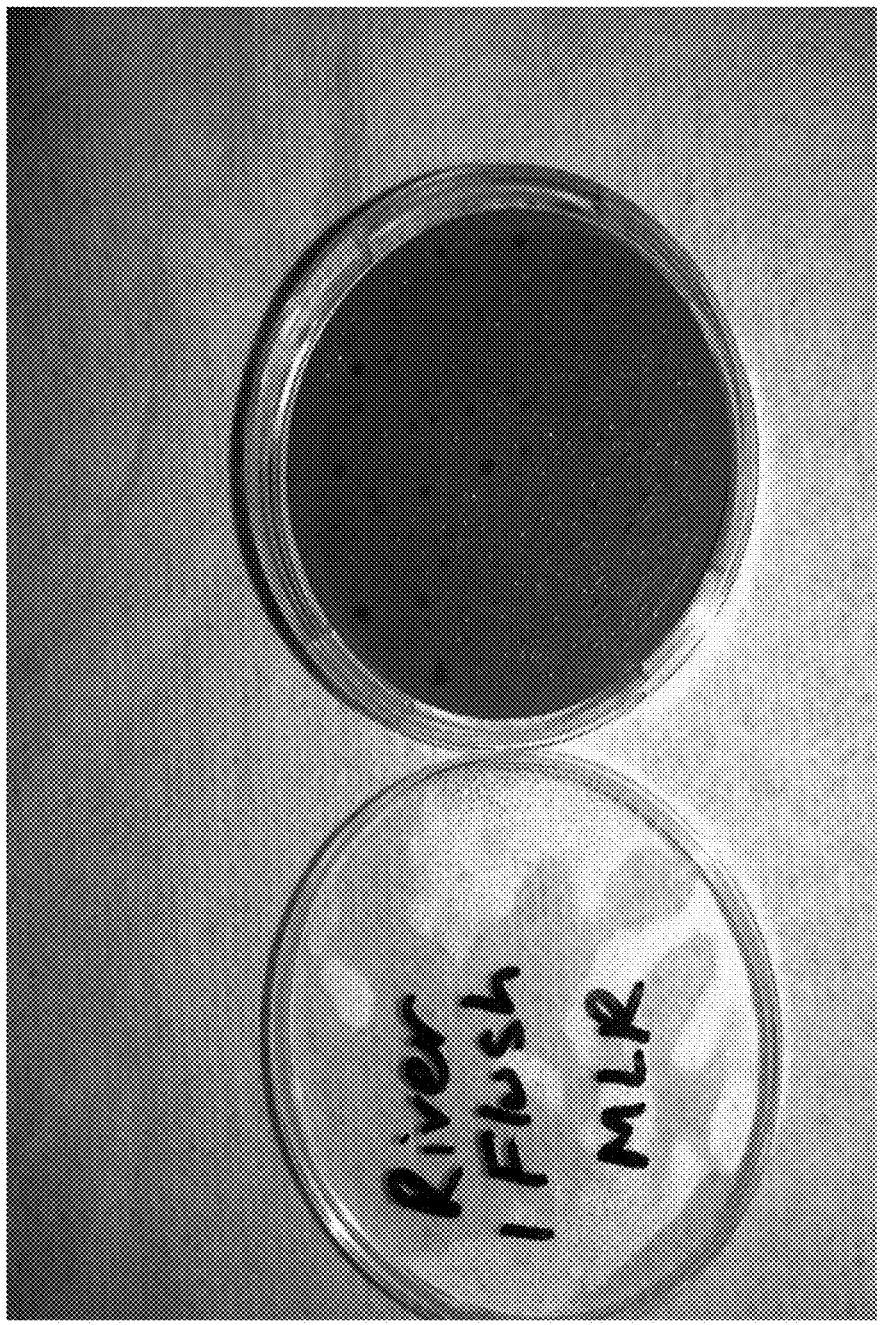
FIGS. 1 and 2 illustrate a petri dish with a sample of contaminated water taken from a pipe that was filled with Missouri River water then flushed once with tap water.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In a first aspect of the present invention, a method is provided for disinfecting water mains using ultraviolet (UV) light. The method includes providing one or more UV light sources that are secured to a movable device that is sized to move axially inside of a pipe. A frequency and an intensity of the UV light from the one or more UV light sources is selected based at least on a material and a size of the pipe, and the pipe is to be disinfected prior to transporting a substance from one location to another location. Further, the method includes remotely causing the movable device to move axially inside of the pipe at a rate that is determined based on one or more characteristics of the pipe. The frequency and the intensity of the UV light and the rate of the movable device through the pipe indicate a dosage of the UV light in relation to the pipe.

In a second aspect of the present invention, a remotely controlled device is provided for transporting a UV light source through a water main for disinfection of the water main. The remotely controlled device includes a body portion that is mechanically coupled to the UV light source so that the UV light source remains centered within the water main as the remotely controlled device moves axially through the water main, the UV light source outputting omni-directional light such that as the remotely controlled device moves axially through the water main, interior surfaces of the water main are contacted by the UV light, the UV light disinfecting the interior surfaces of the water main as it moves through the water main at a rate determined by one or more characteristics of the water main. A frequency and an intensity of the UV light are selected based at least on a material and a size of the water main. Further, the remotely controlled device includes a plurality of movement mechanisms that are coupled to the body portion and that have contact with the interior surface of the water main and allow the remotely controlled device to move axially through the water main.

In a third aspect of the present invention, a remotely controlled UV disinfection system is provided that is used to disinfect water mains. The system includes a UV light source for disinfecting interior surfaces of the water mains and whose frequency and intensity are selected based at least on a material and a size of the water main. The system also includes a remotely controlled device for transporting the UV light source axially through a water main, the remotely controlled device moving axially through the water main at a rate determined based on the frequency and the intensity of the selected UV light source and on one or more characteristics of the water main. The remotely controlled device includes a body portion that is mechanically coupled to the UV light source, and movement mechanisms that are coupled to the body portion for moving the remotely controlled device axially through the water main.

Figure 2:
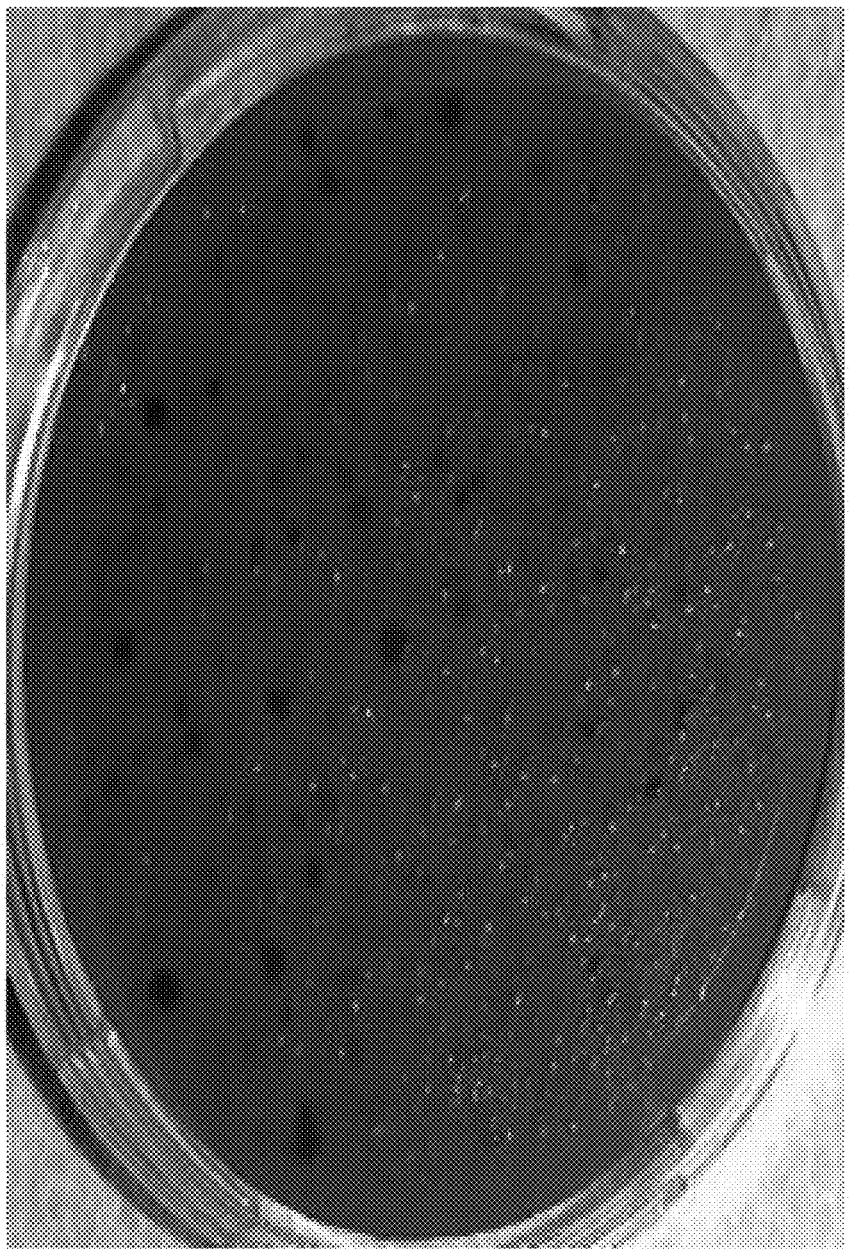

Referring to the drawings in general and initially to FIGS. 1 and 2, a petri dish is shown with a sample of contaminated water taken from a pipe that was filled with Missouri River water then flushed once with tap water. Multiple tests have been done to compare different methods of disinfection on the inside of a pipe, such as a water main. Preliminary tests were conducted to validate the sample and analysis method as well as to verify contamination levels prior to performing the disinfection procedures. These tests confirmed that the contamination procedure was successful and yielded the presence of appropriate coliform and non-coliform bacteria. Additionally, this method of main disinfection was tested with results showing effective and complete inactivation of pathogenic organisms. Here, a PVC pipe was filled with Missouri River water, and subsequently flushed once with tap water. The result of what is shown in FIGS. 1 and 2 is that the contamination was too numerous to count (TNTC). While there was no apparent total coliform growth, TNTC petri dishes are considered to potentially contain coliform bacteria, as the prolific growth of non-coliform bacteria can mask coliform growth.

Figure 3:
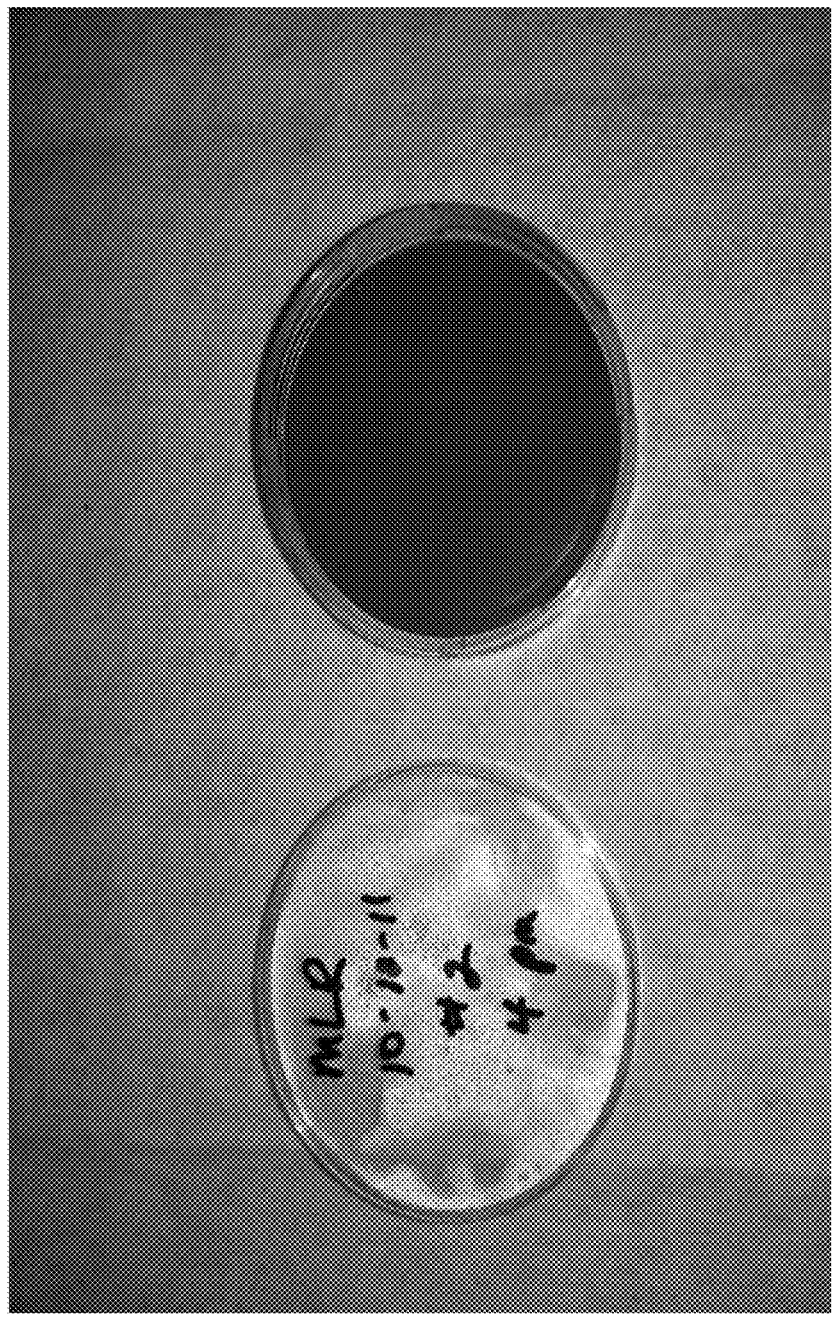
FIG. 3 illustrates a petri dish with a water sample taken after a process of super-chlorination has been applied to a pipe.

Initially, to compare disinfection using UV light with another form of disinfection, super-chlorination was used to disinfect the pipe. As shown in FIG. 3, a petri dish has a water sample taken after a process of super-chlorination has been applied to a pipe. Super-chlorination is a method that has been used to disinfect new water mains. The method of super-chlorination may include pumping bleach into the main to attain greater than 50 ppm of chlorine. The solution sits in the pipe for a minimum of 24 hours. After this waiting period, the super-chlorinated water is flushed out while a de-chlorinating agent is added to neutralize the highly chlorinated water. This method is not only costly, but dangerous for those involved. The results, as expected, show zero Colony Forming Units (CFU), or zero coliform bacteria.

Figure 4:
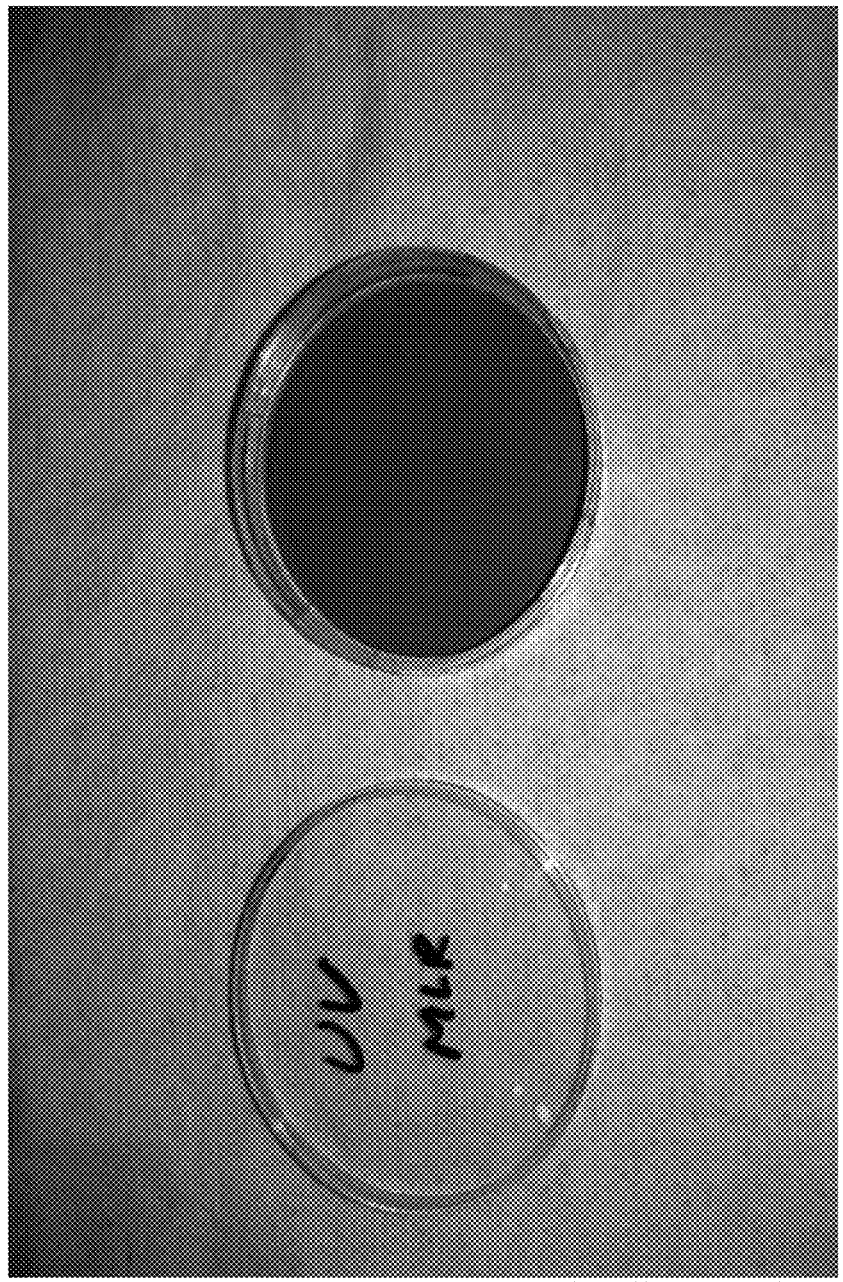
FIG. 4 illustrates a petri dish with a water sample taken after UV light has been applied to a pipe.
Figure 5:
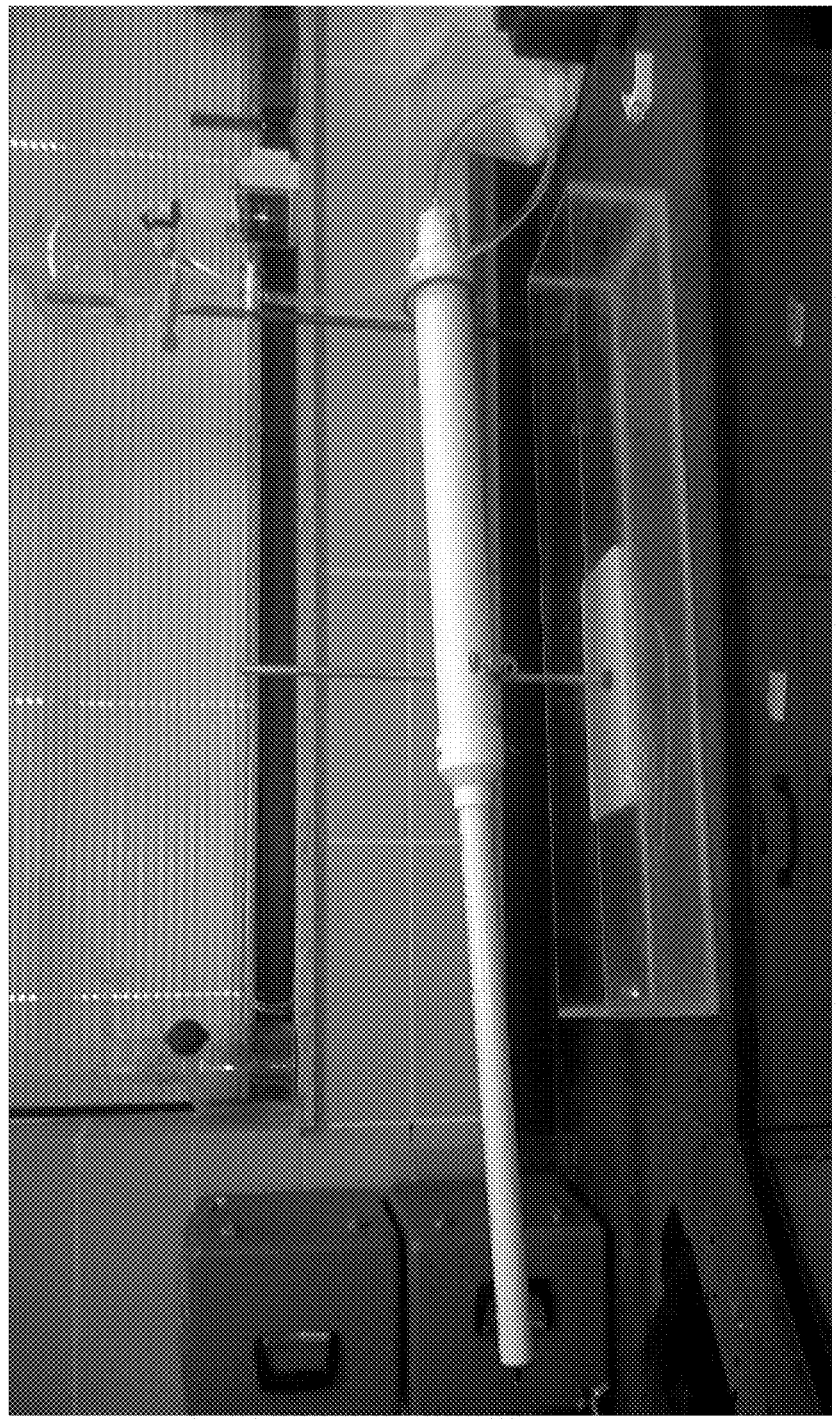
FIG. 5 illustrates a bench scale test for testing the effectiveness of UV light as a disinfectant for a pipe, in accordance with an embodiment of the present invention.

FIG. 4 illustrates a petri dish with a water sample taken after UV light has been applied to a pipe. In accordance with embodiments of the present invention, UV light is used as the disinfecting agent, instead of chlorine. To test the use of UV light as a method of disinfection, a small UV light was attached to sterile tubing and pulled through the three-foot section of contaminated PVC pipe at a rate of 1 foot per minute. The bench scale test is illustrated in FIG. 5. Sample results after filling the pipe with tap water and sampling were acceptable with no coliform or non-coliform bacteria. The tap water used in this experiment was chloraminated water rather than water with free chlorine. Free chlorine water would be more likely to cause some disinfection during the short contact time with the pipe than chloraminated would. As such, the UV light was found to inactivate bacteria. The exemplary test method below describes the testing that was performed in the bench scale pipe shown in FIG. 5.

Exemplary Test Method

As mentioned, FIG. 5 illustrates a small-scale model for testing purposes. A short section (three feet) of three-inch PVC pipe is attached by a reducer to a one-and-a-half inch pipe that is also three feet in length. At the front end is a small barbed ferule that allows for the flow of a contaminated solution. A standard solution of spiked water is used to contaminate the main prior to each testing procedure. The testing procedure is as follows:

(1) The pipe is filled with sterile water and is flushed with tap water (e.g., tap water that is chloraminated rather than having free chlorine) (Sample 1). Sample 1 must pass bacteriological testing. Otherwise, it is repeated. This test is performed to ensure the pipe is free of bacteria prior to the next steps.

(2) The pipe is filled with contaminated water (coliform and non-coliform isolates) and flushed with tap water (Sample 2). This test yields a background level of bacteria present.

(3) If Sample 2 fails bacteriological tests, the pipe is filled with super-chlorinated water to simulate the current disinfection practice (Sample 3).

(4) If Sample 3 passes bacteriological tests, the pipe will again be filled with contaminated water and flushed with tap water (Sample 4). This test is performed to establish a background level of bacteria present.

(5) If Sample 4 fails bacteriological testing, the pipe will have a UV light passed through the main at one minute per foot and then filled with tap water (Sample 5). This test will examine the effectiveness of the new disinfection procedure.

Tests Performed with Results

Test #1 (May 14, 2012: Single Scenario)

(1) Ran unaltered raw water through apparatus to contaminate pipe.

(2) Ran tap water from lab sink through the apparatus. Took one sample for membrane filtration (MF) and heterotropic plate count (HPC) to confirm contamination, such as to test for bacterial growth including total coliform (TC). Used 25% bleach to disinfect connections, tubing, Separatory Funnel, Stop Cock, and rubber stopper, (3) Passed UV light through main pipe at a rate of 1 ft/min. UV light automatically turned off after 90 seconds. Turned the light back on and re-ran the last quarter section of pipe.

(4) Ran tap water from lab sink through the apparatus. Took one sample for MF and HPC to test for bacterial growth including TC.

(5) Results:
   a) MF before UV=0 TC 92 Atypical colonies
   b) MF after UV=0 TC 71 Atypicals colonies
   c) HPC before UV=31 CFU
   d) HPC after UV=22 CFU Test #2 (May 16, 2012: Two Scenarios)

Scenario 1:

(1) Ran double filtered raw water through apparatus to contaminate pipe. Took Colilert 18 sample (the sample was collected in a sterile bottle for analysis using the Colilert-18 methodology, a presence/absence testing methodology) to confirm TC and *E. Coli*. Took another sample for MF and HPC for confirmation. Used 25% bleach solution to disinfect the connections, tubing, Separatory Funnel, stop cock, and rubber stopper.

(2) Passed UV light through main pipe at a rate of 1 ft/45 sec.

(3) Collected 1 L of Tap 2 and ran through apparatus. Took Colilert 18 sample to test for TC and *E. Coli*. Took another sample for MF and HPC to test for bacterial growth including TC.

(4) Results:
  a) Colilert 18:
    Contaminated sample=Present/*E. Coli*
    T2 after UV=Absent
  b) Membrane Filtration:
    Contaminated sample=17 TC
    Too Numerous To Count (TNTC)=Atypical colonies (colonies that are non-coliform bacteria)
    T2 after UV=0 TC, 0 Atypical colonies
    Blank=0 TC, 0 Atypical colonies
  c) HPC:
    Contaminated sample=TNTC
    T2 after UV=1

Scenario 2:

(1) Ran diluted raw water (20 mL raw/980 mL DI) through apparatus to contaminate pipe. Took Colilert 18 sample to confirm TC and *E. Coli*. Took another sample for Membrane Filtration and HPC for confirmation. Used 25% bleach solution to disinfect the connections, tubing, Separatory Funnel, stop cock, and rubber stopper.

(2) Passed UV light through main pipe at a rate of 1 ft/45 sec.

(3) Collected 1 L of Tap 2 and ran through apparatus. Took Colilert 18 sample to test for TC and *E. Coli*. Took another sample for MF and HPC to test for bacterial growth including TC.

(4) Results:
  a) Colilert 18:
    Contaminated sample=Present/*E. Coli*
    T2 after UV=Absent but cloudy
  b) Membrane Filtration:
    Contaminated sample=11 TC, TNTC Atypical colonies
    T2 after UV=0 TC, 10 Atypical colonies
    Blank=0 TC, 0 Atypical colonies
  c) HPC:
    Contaminated sample=148
    T2 after UV=0
  d) Daily Tap 2 results
    Membrane Filtration: 0 TC, 2 Atypical colonies
    HPC: 0

Test #3 (Jun. 7, 2012):

(1) Ran double filtered raw water through apparatus to contaminate pipe. Took Colilert 18 sample to confirm TC and *E. Coli*. Took another sample for Membrane Filtration and HPC for confirmation. Used 100 ppm bleach solution to disinfect the connections, tubing, Separatory Funnel, stop cock, and rubber stopper. The connection, tubing, stop cock, and rubber stopper were submerged in the bleach solution for 5 min. The Separatory Funnel was swirled with bleach for 5 min.

(2) Passed UV light through main pipe at a rate of 1 ft/45 sec.

(3) Collected 1 L of Tap 2 and ran through apparatus. Took Colilert 18 sample to test for TC and *E. Coli*. Took another sample for MF and HPC to test for bacterial growth including TC.

(4) Results:
  a) Colilert 18:
    Contaminated sample=Present/Not *E. Coli*
    T2 after UV=Absent
  b) Membrane Filtration:
  c) Contaminated sample=7 TC, TNTC Atypical colonies
    T2 after UV=0 TC, 0 Atypical colonies
    Blank=0 TC, 0 Atypical colonies
  d) HPC:
    Contaminated sample=Confluent Growth
    T2 after UV=0
  e) Daily T2 Results:
    Membrane Filtration=0 TC, 8 Atypical colonies
    HPC=1

Test #4 (Jun. 11, 2012):

(1) Ran double filtered raw water through apparatus to contaminate pipe. Took Colilert 18 sample to confirm TC and *E. Coli*. Took another sample for Membrane Filtration and HPC for confirmation. Used 100 ppm bleach solution to disinfect the connections, tubing, Separatory Funnel, stop cock, and rubber stopper. The connection, tubing, stop cock, and rubber stopper were submerged in the bleach solution for 5 min. The Separatory Funnel was swirled with bleach for 5 min.

(2) Passed UV light through main pipe at a rate of 1 ft/45 sec.

(3) Collected 1 L of Tap 2 and ran through apparatus. Took Colilert 18 sample to test for TC and *E. Coli*. Took another sample for MF and HPC to test for bacterial growth including TC.

(4) Results:
  a) Colilert 18:
    Contaminated sample=Present/Not *E. Coli*
    T2 after UV=Absent
  b) Membrane Filtration:
    Contaminated sample=0 TC, 145 Atypical colonies
    T2 after UV=0 TC, 23 Atypical colonies
    Blank=0 TC, 0 Atypical colonies
  c) HPC:
    Contaminated sample=TNTC
    T2 after UV=184
  d) Daily Tap 2 Results:
    Membrane Filtration=0 TC, 1 Atypical colony
    HPC=0

Test #5 (Jun. 18, 2012):

(1) Ran diluted raw water (50 mL/950 mL) through apparatus to contaminate the pipe. Took Colilert 18 sample to confirm TC and *E. Coli*. Took another sample for Membrane Filtration and HPC for confirmation. Used 100 ppm bleach solution to disinfect the connections, tubing, Separatory Funnel, stop cock, and rubber stopper. The connections, tubing, stop cock, and rubber stopper were submerged in the bleach solution for 5 min. The Separatory Funnel was swirled with bleach.

(2) Passed UV light through main pipe at a rate of 1 ft/45 sec.

(3) Collected 1 L of Tap 2 and ran through apparatus. Took Colilert 18 sample to test for TC and *E. Coli*. Took another sample for MF and HPC to test for bacterial growth including TC.

(4) Results:
  a) Colilert 18:
    Contaminated sample=Present/*E. Coli*
    T2 after UV=Present/Not *E. Coli* b) Membrane Filtration:
   Contaminated sample=6 TC, TNTC Atypical colonies
   T2 after UV=0 TC, 52 Atypical colonies
   Blank=0 TC, 0 Atypical colonies
c) HPC:
   Contaminated sample=149
   T2 after UV=TNTC
d) Daily Tap 2 Results:
   Membrane Filtration=0 TC, 3 Atypical colonies
   HPC=0
e) T2 sample after UV was most likely contaminated due to shortened disinfection time of all components with the bleach solution.

Figure 6:
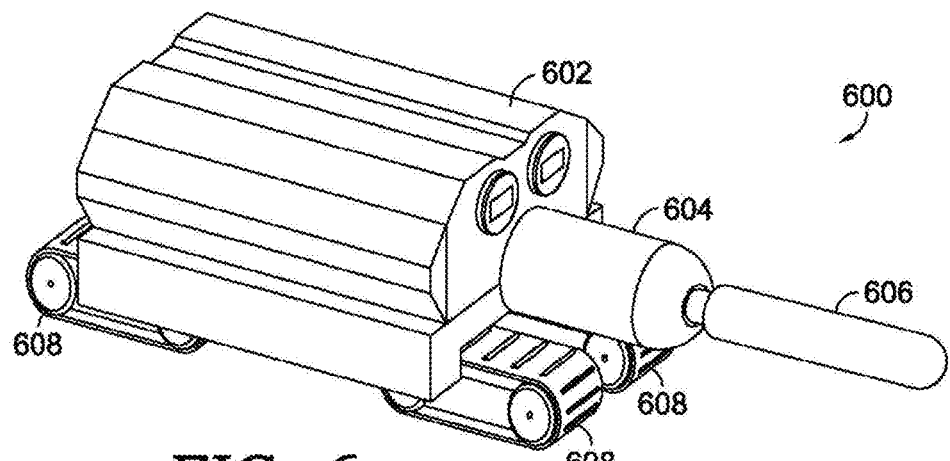
FIG. 6 illustrates a remotely controlled device for transporting a UV light source through a pipe, in accordance with an embodiment of the present invention.

Test #6 (Jun. 19, 2012):
(1) Ran diluted raw water (50 mL/950 mL) through apparatus to contaminate the pipe. Took Colilert 18 sample to confirm TC and *E. Coli*. Took another sample for Membrane Filtration and HPC for confirmation. Used 100 ppm bleach solution to disinfect the connections, tubing, Separatory Funnel, stop cock, and rubber stopper. The connections, tubing, stop cock, and rubber stopper were submerged in the bleach solution for 3-5 min. The Separatory Funnel was swirled with bleach.
(2) Passed UV light through main pipe at a rate of 1 ft/45 sec.
(3) Collected 1 L of Tap 2 and ran through apparatus. Took Colilert 18 sample to test for TC and *E. Coli*. Took another sample for MF and HPC to test for bacterial growth including TC.
(4) Results:
   a) Colilert 18:
      Contaminated sample=Present/*E. Coli*
      T2 after UV=Absent
   b) Membrane Filtration:
      Contaminated sample=22 TC, TNTC Atypical colonies
      T2 after UV=0 TC, 3 Atypical colonies
      Blank=0 TC, 0 Atypical colonies
   c) HPC:
      Contaminated sample=106
      T2 after UV=146
   d) Daily Tap 2 Results:
      Membrane Filtration=0 TC, 5 Atypical colonies Test #7 (Jun. 21, 2012):
(1) Ran diluted raw water (50 mL/950 mL) through apparatus to contaminate the pipe. Took Colilert 18 sample to confirm TC and *E. Coli*. Took another sample for Membrane Filtration and HPC for confirmation. Used 100 ppm bleach solution to disinfect the connections, tubing, Separatory Funnel, stop cock, and rubber stopper. The connections, tubing, stop cock, and rubber stopper were submerged in the bleach solution for 5 min. The Separatory Funnel was swirled with bleach for 5 min.
(2) Passed UV light through main pipe at a rate of 1 ft/45 sec.
(3) Collected 1 L of Tap 2 and ran through apparatus. Took Colilert 18 sample to test for TC and *E. Coli*. Took another sample for MF and HPC to test for bacterial growth including TC.
(4) Results:
   a) Colilert 18:
      Contaminated sample=Present/Not *E. Coli*
      T2 after UV=Absent
   b) Membrane Filtration:
      Contaminated sample=11 TC, TNTC Atypical colonies
      T2 after UV=0 TC, 0 Atypical colonies
      Blank=0 TC, 0 Atypical colonies
   c) HPC:
      Contaminated sample=197
      T2 after UV=7
   d) Daily Tap 2 Results:
      Membrane Filtration=0 TC, 2 Atypical colonies Returning back to the figures, and particularly to FIG. 6, a remotely controlled device 600 for transporting a UV light source through a pipe is illustrated, in accordance with an embodiment of the present invention. Initially, various types and forms of remotely controlled devices may be used with embodiments of the present invention. Several types will be described herein, but that description is not exhaustive. Other types and forms of remotely controlled devices are contemplated to be within the scope of the present invention. The remotely controlled device shown in FIG. 6 includes a body portion 602, a light coupler 604, and movable mechanisms 608. The movable mechanisms 608 in the embodiment of FIG. 6 are tracks that roll through the interior portion of a pipe. Of course, tracks are just one example of movable mechanisms 608 that could be used. Other examples include wheels, spinning wheels, or a rounded object that is built to reduce friction between the movable mechanisms 608 and the interior surface of the pipe. The UV light 606 is coupled to the body portion 602 by way of the light coupler 604, which extends the UV light 606 in front of the remotely controlled device so that the UV light is omni-directional, providing a dosage of light to all interior surfaces of the pipe by which the UV light passes. In an alternative embodiment, the UV light 606 may be located on top of the remotely controlled device, or may even be located behind the device. In one embodiment, one UV light 606 is used with the remotely controlled device 600, but in another embodiment, such as where the pipe diameter is larger, multiple UV lights may be used in a single remotely controlled device 600 to move the light sources closer to the interior walls of the pipe.

In one embodiment, the remotely controlled device travels through the pipe wirelessly, not being tethered to anything. In this embodiment, a drive may be mechanically coupled to the movement mechanisms 608 to cause the remotely controlled device to move through the pipe. A motor may also be used in addition to the drive. In an alternative embodiment, the remotely controlled device is connected to a winch having a cable that is also connected to the remotely controlled device. The winch may operate manually, or may have a motor that operates the winch. The winch will be described in more detail herein with respect to FIG. 10. The remotely controlled device may be controlled at a remote location, such as outside the pipe. In this scenario, a person may have a remote control that is used to determine the rate at which the remotely controlled device travels through the pipe. Alternatively, the remotely controlled device may include software that allows for the device to operate on its own without human intervention. For instance, the device may be programmed with a rate at which it is to travel through the pipe. Information inputted into the device may also include a length of the pipe, pipe diameter, etc.

Figure 7:
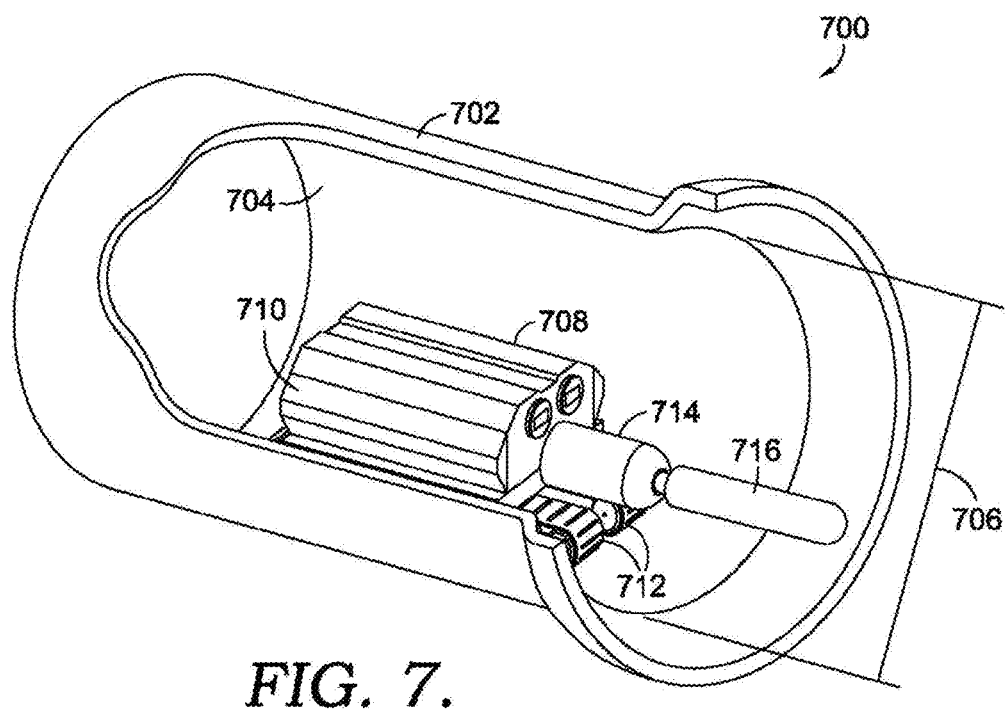
FIG. 7 illustrates a section view of a pipe with a remotely controlled device inside the pipe for transporting a UV light source, in accordance with an embodiment of the present invention.

FIG. 7 illustrates a section view 700 of a pipe with a remotely controlled device inside the pipe for transporting a UV light source, in accordance with an embodiment of the present invention. As mentioned, many different remotely controlled devices may be used, and the one illustrated in FIG. 7 is shown for illustrative purposes only. The pipe 702 has an interior surface 704, and has a diameter illustrated by item 706. The diameter 706 of the pipe 702 may be used to determine the frequency and intensity of the UV light used, and may also be used to determine how fast the remotely controlled device is to move through the pipe. Here, the remotely controlled device 708 has a top portion 710, a light coupler 714 attached to the UV light 716, and movement mechanisms 712.

Figure 8:
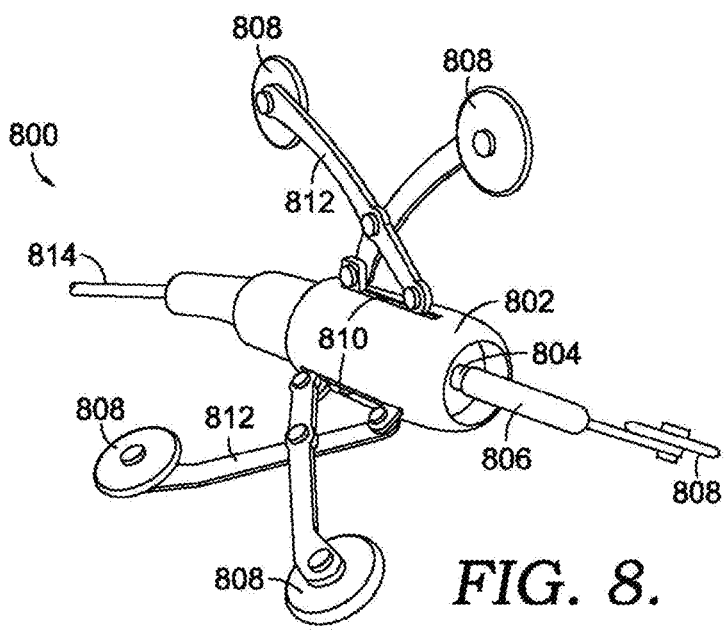
FIG. 8 illustrates a remotely controlled device for transporting a UV light source through a pipe, in accordance with an embodiment of the present invention.

FIG. 8 illustrates another remotely controlled device 800 for transporting a UV light source through a pipe, in accordance with an embodiment of the present invention. As previously mentioned, the remotely controlled devices shown and described herein are provided for exemplary purposes only. Other devices are contemplated to be within the scope of the present invention. The remotely controlled device 800 includes a body portion 802, a light coupler 804 for attaching the UV light source 806 to the remotely controlled device 800, and movement mechanisms 808. The body portion 802 is mechanically coupled to the UV light source 806 so that the UV light source 806 remains centered within the water main as the remotely controlled device 800 moves axially through the water main. In one instance, the UV light source 806 is mounted to a top portion of the body portion 802, but in another instance, is mounted to a front portion of the body portion 802. As mentioned, there may be one UV light source 806 mounted to the body portion 802, but in some embodiments, more than one UV light source 806 is used to ensure all interior walls of the pipe are disinfected, which may be the case for larger diameter pipes. The movement mechanisms 808 in the embodiment of FIG. 8 are wheels that rotate when the remotely controlled device is moved through the pipe. Here, the movement mechanisms 808 are secured to the body portion 802 by attachment members 812. The attachment members 812 are secured to the body portion 802 by way of a movement slot 810 that allows the attachment members 812 to slide either closer to each other or apart from each other. The movement slot 810 allows the remotely controlled device 800 to adapt to either smaller or larger diameter pipes. For instance, embodiments of the present invention can be used in conjunction with small mains (e.g., 4 inches, 6 inches) and larger mains (e.g., 20 inches). The portion of the attachment members 812 that makes contact with the movement slot 810 may be a moveable pivot point so that it can pivot to adjust based on the size of the pipe. The adjustment of the attachment members 812 to fit different pipe sizes may be accomplished by using tension, a spring, compression, or the like.

Also included on the remotely controlled device 800 is a tether 814 that can be used, in some embodiments, to connect the remotely controlled device 800 to a winch, which will be discussed further herein. As mentioned, the tether 814 may be coupled to the body portion 802, and may be provided for physical manipulation of the remotely controlled device, such as when a winch is utilized. Alternatively, the tether 814 illustrated in FIG. 8 may be for transmission of control signals to or from the remotely controlled device. Even further, the tether 814 may be used for video relay from the remotely controlled device. In this embodiment, the remotely controlled device may include one or more cameras for capturing video as the device moves through the pipe. Alternative to or in addition to the cameras, one or more flashlights may be mounted to the remotely controlled device. In one embodiment, a winch may not be used to physically manipulate the movement of the remotely controlled device, and instead, a drive is mechanically coupled to the plurality of movement mechanisms that causes the remotely controlled device to move through the water main. The drive may be driven by one of many different forms of energy, and as such, may be operated pneumatically, hydraulically, etc.

In the embodiment of FIG. 8, the UV light source outputs omni-directional light such that as the remotely controlled device 800 moves axially through the water main, the interior surfaces of the water main are contacted by the UV light as the UV light passes by these surfaces. As such, the top, bottom, and side portions of the interior surface of the pipe all receive a substantially equal dosage of the UV light.

In one embodiment, the remotely controlled device requires a power source. In this case, the power source may be electric, and as such the device may have a power cord attached thereto. Alternatively, a portable power supply, such as a battery, may be used to power the remotely controlled device. In other embodiments, the remotely controlled device may not require a power source. Here, the UV light source may have its own power source such that the remotely controlled device does not need one.

Figure 9:
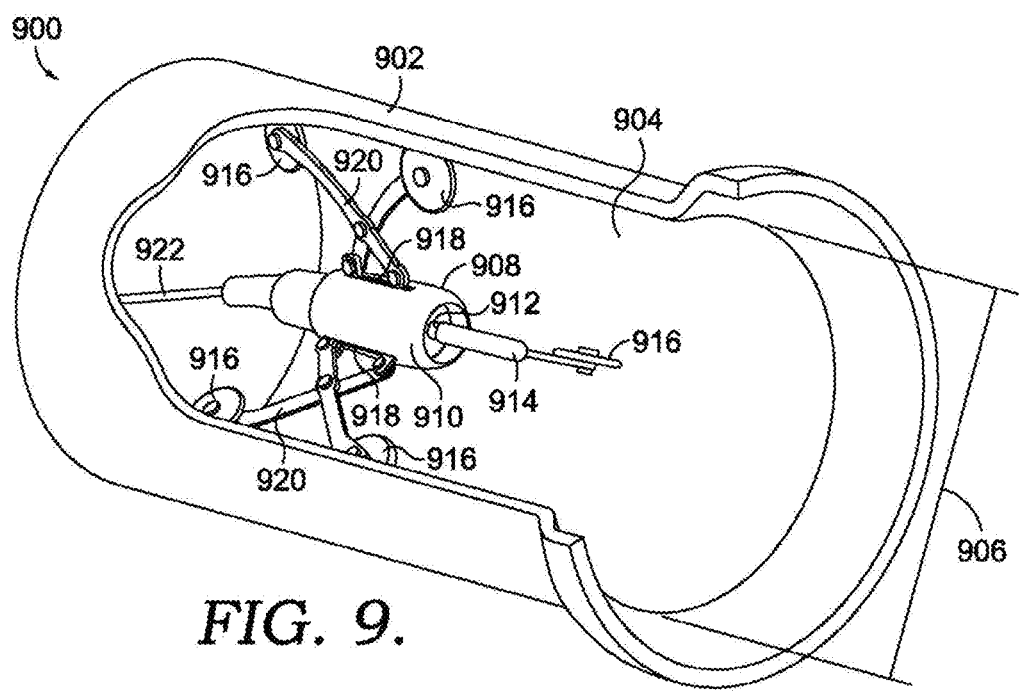
FIG. 9 illustrates a section view of a pipe with a remotely controlled device inside the pipe for transporting a UV light source, in accordance with an embodiment of the present invention.

FIG. 9 illustrates a section view 900 of a pipe with a remotely controlled device inside the pipe for transporting a UV light source, in accordance with an embodiment of the present invention. The remotely controlled device illustrated in FIG. 9 is similar to the device of FIG. 8. Here, the pipe 902 includes an interior surface 904 and a diameter, represented by item 906. The remotely controlled device 908 includes a body portion 910, a light coupler 912 that connects the body portion 910 to the UV light 914, and movement mechanisms 916. Here, the movement mechanisms 916 are secured to the body portion 910 by attachment members 920. The attachment members 920 are secured to the body portion 910 by way of a movement slot 918 that allows the attachment members 920 to slide either closer to each other or apart from each other. The movement slot 918 allows the remotely controlled device 908 to adapt to either smaller or larger diameter pipes. The tether 922 is illustrated for use by a winch, which controls the forward and reverse movement of the remotely controlled device through the pipe. In one embodiment, the remotely controlled device is not tethered to a winch, and thus may operate wirelessly and without cords and tethers. In this instance, a drive, which may be attached to a motor, may be mechanically coupled to the movement mechanisms.

Figure 10:
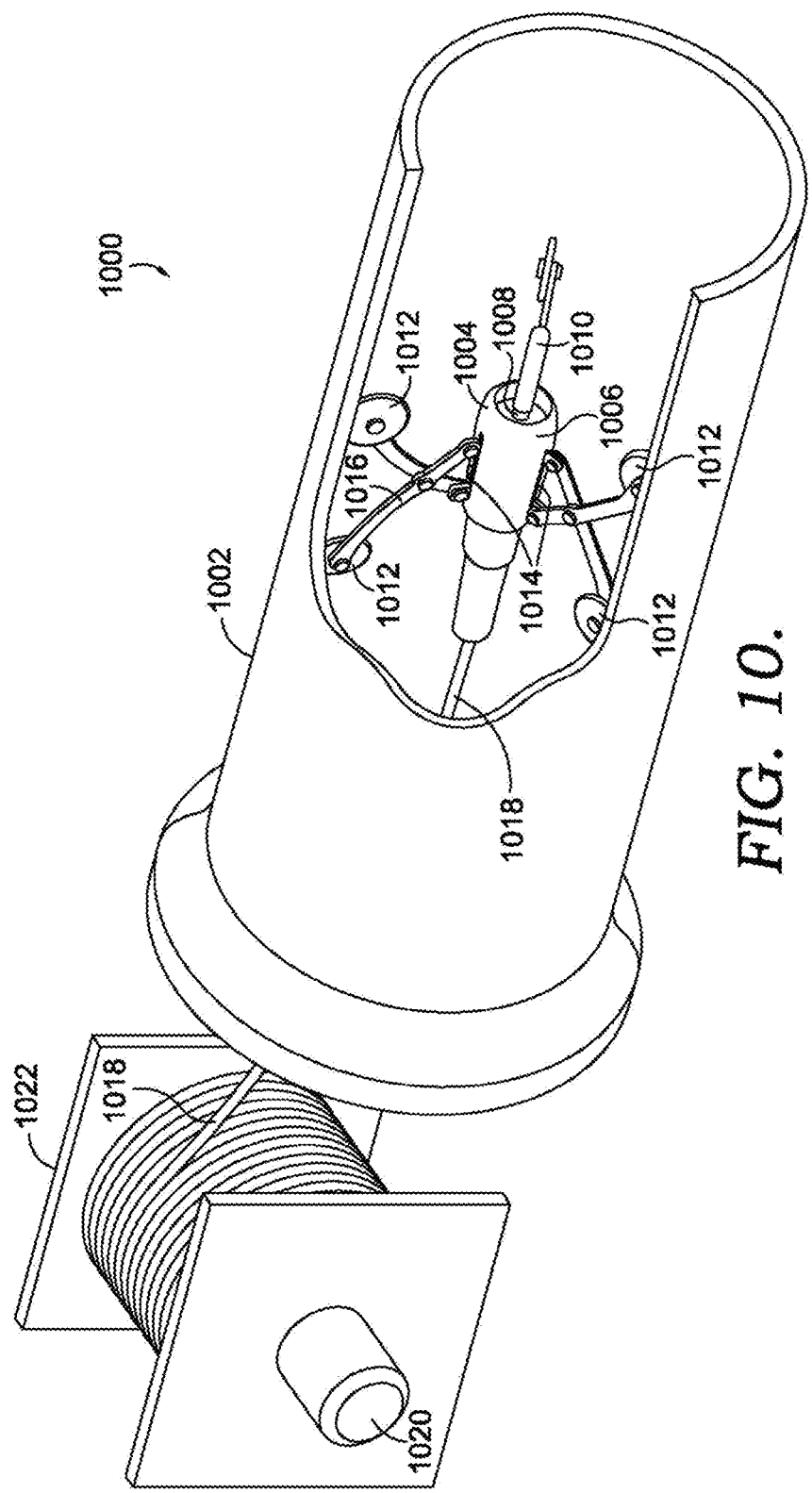
FIG. 10 illustrates a section view of a pipe with a remotely controlled device inside the pipe and a winch for transporting a UV light source, in accordance with an embodiment of the present invention.

FIG. 10 illustrates a section view of a pipe with a remotely controlled device inside the pipe and a winch for transporting a UV light source, in accordance with an embodiment of the present invention. The remotely controlled device 1004 is located within the pipe 1002, and includes a body portion 1006, a light coupler 1008 that attaches the UV light 1010 to the remotely controlled device 1004, and movement mechanisms 1012. Here, the movement mechanisms 1012 are secured to the body portion 1006 by attachment members 1016. The attachment members 1016 are secured to the body portion 1006 by way of a movement slot 1014 that allows the attachment members 1016 to slide either closer to each other or apart from each other. The movement slot 1014 allows the remotely controlled device 1004 to adapt to either smaller or larger diameter pipes. The remotely controlled device 1004 has a tether 1018, which in this embodiment, may be a cable that attaches it to a winch 1022. The winch 1022 also may have a drive and a motor 1020 that turns the winch in one direction to move the remotely controlled device in a forward direction, and that turns the winch in a different direction to move the remotely controlled device in a reverse direction. This allows the remotely controlled device to be tethered to an object outside of the pipe, and still allows it to be remotely controlled from a location outside of the pipe. A winch may take on many forms. For instance, the winch may be secured to the pipe itself, or may be a standalone object. Many times, the winch is contained within a box or some other protective covering, although not shown here in FIG. 10.

Figure 11:
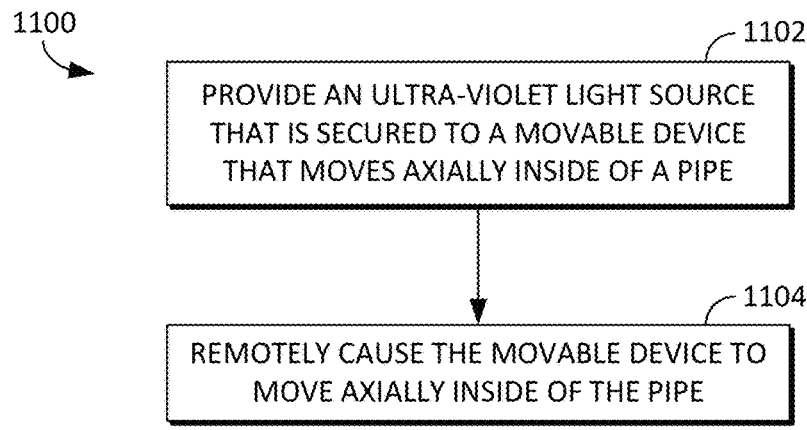
FIG. 11 illustrates a flow diagram of a method for disinfecting water mains using UV light.

FIG. 11 illustrates a flow diagram of a method 1100 for disinfecting water mains using UV light. A pipe, such as a water main, is typically disinfected prior to its use in transporting a substance from one location to another within the pipe. For instance, water main pipes transport water from one location to another location. Prior to transporting water, the water main is disinfected to kill any bacteria or other harmful organisms on the interior of the pipe.

Initially, a UV light source is provided at step 1102 that is secured to a movable device that moves axially inside of a pipe. The UV light source is selected based on various characteristics, including its frequency and intensity. Characteristics of the pipe are taken into consideration when the frequency and intensity of the UV light source are determined. These characteristics may include the material of the pipe and the size (e.g., diameter) of the pipe. For example, a smaller pipe may require a UV light source having a lower frequency and intensity than that required for a larger pipe. The UV light source may provide a pulsed emission of light in one embodiment, but in an alternative embodiment, may provide a continuous emission of light.

UV light is electromagnetic radiation with a wavelength shorter than that of visible light, and is in the range between 10 nm and 400 nm, which corresponds to photon energies from 3 eV to 124 eV. Although UV light is found in natural sources, such as sunlight, it is also found in artificial sources, including black lights, short wave UV lamps, gas-discharge lamps, UV LEDs, and UV lasers. The germicidal effectiveness curve (i.e., effectiveness for UV absorption by DNA) has two peaks. The first peak is about 185 nm, and the other is about 265 nm. As such, UV light having a wavelength of between 100 nm to 280 nm is typically the range used to sterilize surfaces and kill organisms on those surfaces. As such, in one embodiment, the UV light source used is a low-pressure mercury-vapor lamp, which emits about 86% of its light at 254 nm, which is close to the second peak mentioned above. UV light at these germicidal wavelengths causes adjacent thymine molecules on DNA to dimerize. If enough of these defects accumulate on a microorganism's DNA, its replication is inhibited, thereby rendering it harmless. The wavelength range of UV light used in embodiments described herein is 10 nm to 400 nm, and more specifically, between 100 nm and 280 nm.

At step 1104, the movable device is remotely caused to move axially inside of the pipe at a rate that is determined based on one or more characteristics of the pipe. These characteristics may include a size and material of a pipe, so that the interior surface of the pipe receives the appropriate dosage of UV light as the movable device moves axially in the pipe. As used herein, the dosage of UV light is dictated by the frequency and intensity of the UV light, and the rate of the movable device through the pipe, and refers to quantity of photons emitted from the UV light source. As the UV light source moves in the pipe, the interior surface of the pipe is disinfected, thereby killing harmful pathogenic bacteria. It should be noted that instead of a surface moving by a stationary UV light source, here, the UV light source is moving and the surface is stationary.

The length of the pipe may be determined, and may be used to know how far into the pipe the movable device is to travel before returning to the starting point. In one embodiment, the movable device includes a body portion that is mechanically coupled to the UV light source, and movement mechanisms that are coupled to the body portion for moving the automated device axially through the pipe. The movement portions may be any type of mechanisms that can move along a pipe, including wheels, rollers, tracks, or some other mechanism that is rounded and can easily slide along the interior surface of the pipe at a reduced friction. The movable device may be coupled to a winch by way of a cable so that the winch causes the movable device to move in a forward direction and a reverse direction through the pipe, depending on whether the movable device is moving away from the winch, thus disinfecting the pipe, or moving toward the winch, moving toward its starting position. The winch may be driven by a motor and a drive shaft that allows the movable device to be remotely controlled. For instance, an operator may control the movement of the movable device by controlling the winch.

In one embodiment, the remotely controlled device includes a detector that can detect if the UV light has failed such as if the light bulb burned out while traveling through the pipe. The remotely controlled device may have an alarm that goes off if the UV light has somehow failed, or may send a signal back to a controller that would allow the operator to know that the UV light has failed. This feature would allow the operator to know to repair the issue, such as install a new UV light source, so that the interior of the pipe can be adequately disinfected.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure. Further, alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for disinfecting water mains using ultraviolet (UV) light, the method comprising:
   providing one or more UV light sources that are secured to a movable device configured to move axially through a pipe, a size of the movable device being mechanically adjustable with scissor hinges such that the movable device can move axially inside one of a plurality of pipes, each of the plurality of pipes having different diameters, wherein a frequency and an intensity of the UV light from the one or more UV light sources is selected based at least on a material and a size of the pipe, and wherein the pipe is to be disinfected prior to transporting a substance from one location to another location; and
   remotely causing the movable device to move axially inside of the pipe at a rate that is determined based on one or more characteristics of the pipe, wherein the frequency and the intensity of the UV light and the rate of the movable device through the pipe indicate a dosage of the UV light in relation to the pipe.

2. A method for disinfecting water mains using ultraviolet (UV) light, the method comprising:
   providing one or more UV light sources that are secured to a movable device configured to move axially through a pipe, the movable device having a mechanically adjustable effective diameter equal to an inner diameter of the pipe, wherein the effective diameter of the movable device is mechanically adjustable with scissor hinges to equal a plurality of inner diameters of pipes, wherein a frequency and an intensity of the UV light from the one or more UV light sources is selected based at least on a material and a size of the pipe, and wherein the pipe is to be disinfected prior to transporting a substance from one location to another location; and remotely causing the movable device to move axially inside of the pipe at a rate that is determined based on one or more characteristics of the pipe, wherein the frequency and the intensity of the UV light and the rate of the movable device through the pipe indicate a dosage of the UV light in relation to the pipe.

3. A method for disinfecting water mains using ultraviolet (UV) light, the method comprising:

providing one or more UV light sources that are secured to a movable device that is sized to move axially inside of a pipe, the movable device having at least three contact members that contact an inner surface of the pipe, wherein a frequency and an intensity of the UV light from the one or more UV light sources is selected based at least on a material and a size of the pipe, and wherein the pipe is to be disinfected prior to transporting a substance from one location to another location; and remotely causing the movable device to move axially inside of the pipe while the at least three contact members maintain contact with the inner surface of the pipe at a rate that is determined based on one or more characteristics of the pipe, wherein the frequency and the intensity of the UV light and the rate of the movable device through the pipe indicate a dosage of the UV light in relation to the pipe, wherein a size of the movable device is mechanically adjustable with scissor hinges that allow the at least three contact members to maintain contact with the inner surface of a plurality of different sized pipes.

4. The method of claim 3, further comprising disinfecting the pipe using the UV light.

5. The method of claim 3, further comprising providing a length of the pipe for transporting the substance from one location to another location, wherein the pipe is disinfected prior to being used to transport the substance.

6. The method of claim 3, wherein the disinfection of the pipe allows for disinfection of harmful pathogenic bacteria.

7. The method of claim 3, wherein the movable device comprises:

a body portion that is mechanically coupled to the one or more UV light sources, and movement mechanisms that are coupled to the body portion for moving an automated device axially through the pipe.

8. The method of claim 3, wherein the movable device is coupled to a winch by way of a cable so that the winch causes the movable device to move in one or more of a forward direction or a reverse direction through the pipe.

9. The method of claim 8, wherein the winch is driven by a motor that allows the movable device to be remotely controlled.

10. The method of claim 3, wherein a wavelength range of the UV light is between 10 nm and 400 nm.

11. The method of claim 3, wherein a wavelength range of the UV light is between 100 nm and 280 nm.

12. The method of claim 3, wherein the at least three contact members are radially spaced around the moveable device.

13. The method of claim 3, wherein the at least three contact members are each coupled to the movable device with a scissor hinge.

14. The method of claim 13, wherein each of the scissor hinges are configured to adjust the radial position of the at least three contact members relative to a center of the movable device.

15. The method of claim 13, further comprising adjusting an effective diameter of the movable device such that the at least three contact members are radially positioned to maintain radial contact with the inner surface of the pipe.

16. The method of claim 15, wherein the inner diameter of the pipe is selected from the group comprising 4 inches, 6 inches, and 20 inches.

17. The method of claim 3, wherein the at least three contact members comprise wheels.

* * * * *